United States Patent [19]
Jannasch et al.

[11] 3,972,395
[45] Aug. 3, 1976

[54] OXIDATION INHIBITING CAPS FOR CARBON FRICTION DISC

[75] Inventors: Norman E. Jannasch; Norris A. Hooton, both of South Bend, Ind.

[73] Assignee: The Bendix Corporation, South Bend, Ind.

[22] Filed: Sept. 29, 1975

[21] Appl. No.: 617,543

Related U.S. Application Data

[63] Continuation-in-part of Ser. No. 456,323, March 29, 1974, abandoned.

[52] U.S. Cl. ............................ 188/251 A; 188/71.5; 192/107 M
[51] Int. Cl.² ........................................ F16D 69/02
[58] Field of Search ........ 188/71.5, 218 XL, 251 R, 188/251 A, 251 M; 192/107 M, 70.14

[56] References Cited
UNITED STATES PATENTS

| | | | |
|---|---|---|---|
| 3,639,197 | 2/1972 | Spain | 188/251 A |
| 3,650,357 | 3/1972 | Nelson et al. | 188/251 R |
| 3,692,150 | 9/1972 | Ruppe, Jr. | 188/251 A |
| 3,712,427 | 1/1973 | Cook et al. | 188/251 A |
| 3,794,509 | 2/1974 | Trauger et al. | 188/251 A |
| 3,892,293 | 7/1975 | Dowell | 188/251 A |
| 3,932,568 | 1/1976 | Watts et al. | 188/251 A |

*Primary Examiner*—Trygve M. Blix
*Assistant Examiner*—Edward R. Kazenske
*Attorney, Agent, or Firm*—Leo H. McCormick, Jr.; William N. Antonis

[57] ABSTRACT

Carbon cloth sheaths impregnated with oxidation inhibiting materials are located between drive slots on the periphery of a carbon friction disc to prevent structural degradation of a band of continuous carbon fibers located in the disc through which a braking torque is uniformly distributed throughout the carbon friction disc during frictional engagement. A metal screen is mated to the carbon cloth by a resin binder. The metal screen carbon cloth sheaths or caps may be held on the disc periphery by locating pins to permit a resin binder bond to be established between each cap and associated arcuate segment of the periphery of the carbon friction disc. Anchor pins which hold a series of metal reinforcing plates in a fixed position with the drive slots extend through the walls of the reinforced carbon caps and the carbon friction disc to reduce the possibility of delamination between the reinforced carbon caps and the periphery.

15 Claims, 11 Drawing Figures

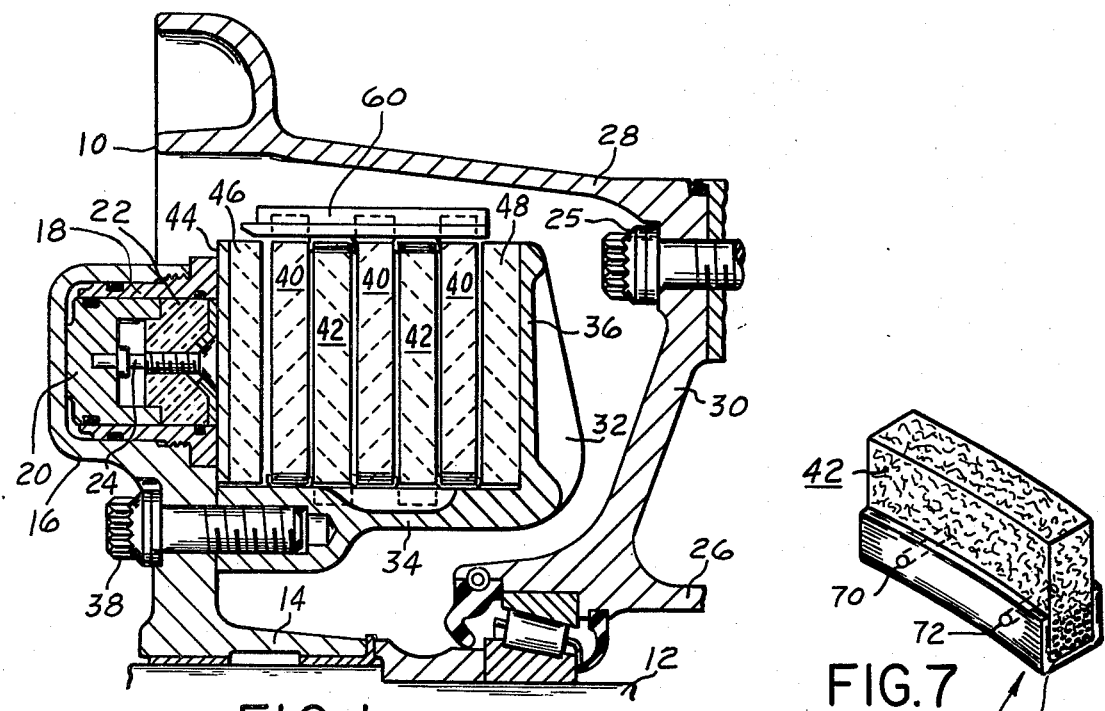
FIG. 1
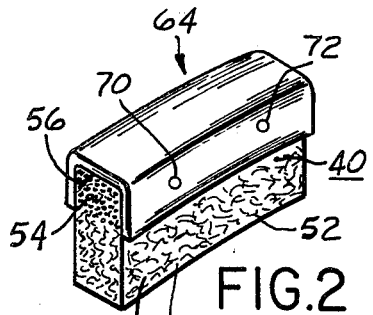
FIG. 2
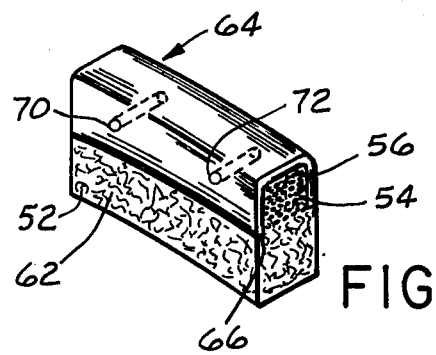
FIG. 3
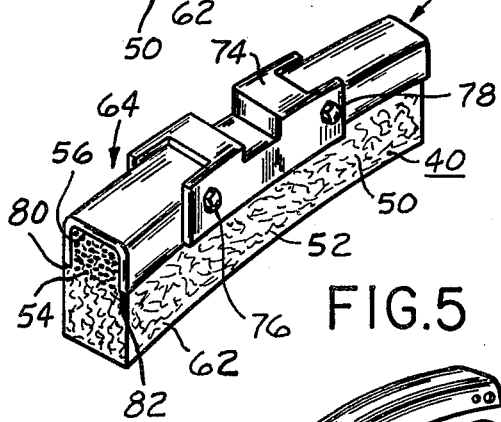
FIG. 5
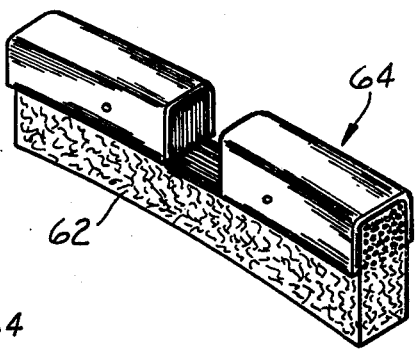
FIG. 4
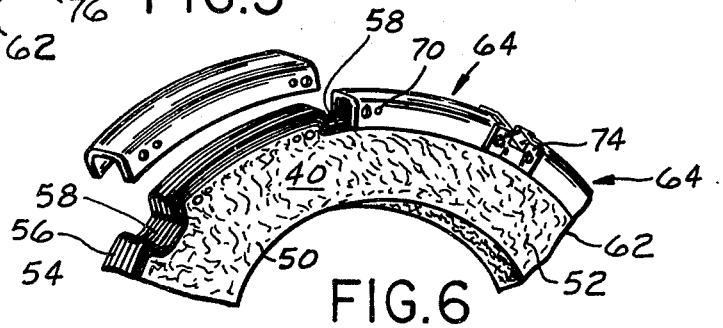
FIG. 6
FIG. 7

OXIDATION INHIBITING CAPS FOR CARBON FRICTION DISC

BACKGROUND OF THE INVENTION

This application is a continuation-in-part of application Ser. No. 456,323 filed Mar. 29, 1974, now abandoned.

The use of carbon discs as a friction element in a wheel and brake assembly for aircraft has gained acceptance as a way of increasing the payload and increasing effectiveness of a braking system.

In U.S. Pat. No. 3,639,197 assigned to the same assignee as the invention and incorporated herein by reference, it is disclosed how a continuous carbon fiber can provide a carbon disc with the structural unity needed to absorb reported braking torque. Such a carbon disc when used in aircraft braking systems can often experience thermal conditions above 800°F. Above 800°F the non-swept areas of the carbon disc are subject to oxidation which can cause a complete disintegration of the carbon matrix and continuous carbon fiber resulting in a brake failure.

In U.S. patent application Ser. No. 324,624, now U.S. Pat. No. 3,914,508 incorporated herein by reference, a method is disclosed for protecting a carbon substrate in a moist environment from oxidation by coating a selected surface thereof with a boron and metallic mixture which is held therein by a resin matrix. As with most coatings it was difficult to maintain uniform thickness over the entire peripheral surface. As a result where the coating is limited or absent, deterioration of the carbon substrate will take place after a period of time during a brake application sequence.

In another patent a metal ring was press fit around the outer periphery to prevent the oxidation in the non-swept area of a carbon friction disc. During frictional operation when the thermal energy produced was low, the unit operated effectively. As the temperature increased, the unity of the carbon disc and steel ring changed in direct proportion to the differences in their thermal coefficients of expansion. After a repeated number of frictional engagements at high temperatures, structural defects in the metal occurred along the periphery of the carbon disc because of the different coefficients of expansion.

SUMMARY OF THE INVENTION

We have developed a carbon friction disc for use in a wheel and brake assembly of an aircraft wherein a series of woven carbon cloth sheaths reinforced by a laminated screen which encapsulate the peripheral surface of the friction disc to prevent oxidation from destroying the structural strength life stability of the non-swept areas. The strength of the peripheral area is enhanced by a bond of interwoven continuous carbon fibers through which a braking torque is uniformly transmitted from a key slot coupling means. Each of the woven carbon cloth sheaths and reinforcing screen are impregnated with a resin solution containing an oxidization inhibitor before being attached to the periphery by a resin binder. A plurality of aligning pins may be employed in such a manner that they extend through the carbon disc to hold the carbon cloth screen reinforced sheaths securely against the peripheral surface prior to curing the resin binder. A reinforcing metal means is positioned within each slot to form a driving lug through which the rotational torque is transmitted between the wheel and stationary brake housing.

It is therefore the object of this invention to provide a carbon friction disc with a series of woven carbon screen reinforced sheaths to protect the periphery thereof from oxidation during a brake application.

It is another object of this invention to provide a carbon friction disc with a series of oxidization resistant carbon cloth sheaths located between driving slots on the non-swept periphery thereof with keeper means which prevent a resin bond therebetween from rupturing which would permit oxidization of the peripheral area.

It is a further object of this invention to provide a carbon cloth sheath for capping the non-swept segments of a carbonn friction disc to prevent oxidization of the carbonaceous matrix of the friction disc.

It is a still further object of this invention to provide a carbon friction disc having a carbon cloth cap with a screen reinforcing means to prevent abrasion of the carbon cloth caps and structural support for the carbon cloth cap after repetitive brake application.

BRIEF DESCRIPTION OF THE DRAWINGS

FIG. 1 is a sectional view of a wheel and brake assembly for use on aircraft having a carbon friction disc with an oxidization protection reinforced carbon sheath to prevent degradation of non-swept peripheral surfaces during a braking sequence.

FIG. 2 is a perspective view of a segment of a carbon friction disc having a protective carbon sheath which encases the outer periphery thereof.

FIG. 3 is a perspective view of a segment of a carbon friction disc having a protective carbon sheath integrally bonded to the peripheral surface.

FIG. 4 is a perspective view of a segment of a carbon friction disc having a protective carbon sheath retained by aligning pins adjacent to a driving slot on the periphery thereof.

FIG. 5 is a perspective view of a segment of a carbon friction disc having a driving slot therein reinforced by a metal strap.

FIG. 6 is a perspective view of a segment of a carbon friction disc showing the sequential attachment of a carbon cloth sheath to the outer periphery.

FIG. 7 is a perspective view showing a carbon cloth sheath attached to the inner periphery of a segment of a carbon friction disc.

DETAILED DESCRIPTION OF THE PREFERRED EMBODIMENT

Figure 8:
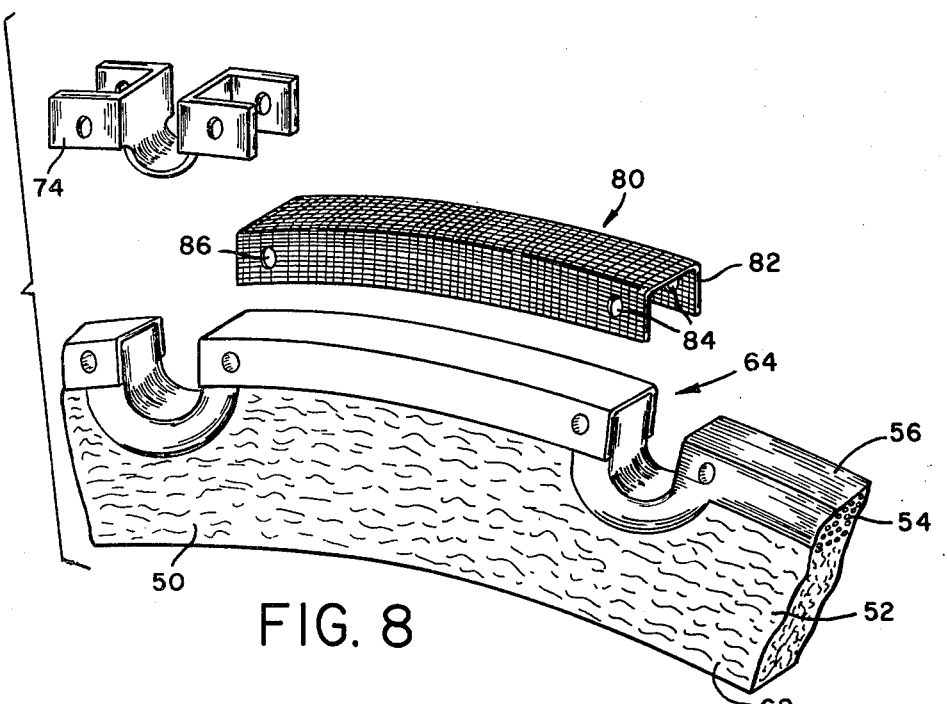
FIG. 8 is a perspective view of a segment of a carbon friction disc having a protective carbon sheath integrally bonded to the peripheral surface with an exploded view of a protective reinforcing screen adapted to cover and prevent abrasion of the carbon cap.

The wheel and brake assembly shown in FIG. 1 includes a wheel 10 rotatably mounted on a stationary axle 12 having a stationary carrier member 14 fixed thereto by any suitable means, such as by a direct bolt connection (not shown). The construction for rotatably mounting wheel 10 to axle 12 and fixing the stationary carrier member 14 to the axle is well known, and a detailed description thereof is not deemed to be necessary. The carrier contains a plurality of fluid motors 16 each of which includes a protective sleeve 18 threadedly secured to the carrier and a piston 20 located and slidable in the sleeve. A block of insulating material 22 is secured to the head end of the piston by a threaded pin 24 for protecting the hydraulic brake fluid from the heat generated during braking. The wheel 10, which is formed of two sections is fastened together by a plurality of bolts 25. The wheel 10 includes a hub portion 26 and a rim portion 28 interconnected by a plurality of spokes 30. A torque tube 32 which includes a sleeve 34 and an annular backing plate flange 36 is fixedly secured to the carrier member 14 by a plurality of circumferentially spaced bolts 38.

The brake which is illustrated is of the disc type and includes a plurality of interleaved rotors 40, which are splined to and are rotated by the aircraft wheel 10, and a plurality of stators 42, which are splined to sleeve 34 of the torque tube 32. The specific novel construction of the rotors will be described hereafter. Both the rotors and stators are movable axially and are sometimes referred to as a brake "stack". It is the frictional engagement of these relatively rotatable rotors and stators which produces the desired braking action on the aircraft wheel. A pressure plate 44, to which a friction pad 46 is secured is suitably attached to the fluid motor 16 for forcing the rotors 40 and stators 42 against each other by biasing the entire stack against friction pad 48 on the backing plate 36 in response to an actuation force being supplied to piston 20.

Each of the rotors 40 consists of a solid carbon friction disc 50, see FIG. 2, formed from a plurality of randomly oriented carbon fibers 52 retained within a band of continuous carbon fibers 54 by a carbonaceous matrix 62. The band of continuous fibers 54 are interwoven to provide a path through which the rotational torque applied through notches 58 of a key-slot coupling. The notches 58 are equally spaced on the peripheral surface 56, see FIG. 6, of the carbon disc 40. Each notch 58 slidably engages an axial key 60, see FIG. 1, located on the inner periphery of the aircraft wheel 10. It is understood that the key-slot arrangement of the rotor 40 and wheel 10 could be reversed; however, by placing the slots in the carbon disc 50 the possibility of a shear failure is greatly reduced.

A series of carbon cloth sheath means 64 is located on the peripheral surface 56 of the carbon disc 50 between the notches 58. Each of the carbon cloth sheath means 64 is made from a woven carbon cloth which has been impregnated with a filler means for inhibiting oxidization. The filler means will be selected from a group consisting of Phosphorous, Boron, Aluminum, Manganese, Chromium, Silicon, Tantalum and oxides of these elements, and a thermosetting resin suspended in a solvent. The volatiles in the solvent are removed by forced air drying at room temperature for 1 to 2 hours, after which the woven carbon cloth is placed in a vacuum oven having a temperature between 70°–90°C for 15 to 20 minutes. The impregnated woven carbon cloth can now be stored for an extended period of time at a temperature of 10°C without any deterioration.

When the need for a carbon cloth sheath means 64 arises, a piece (single thickness) of impregnated woven carbon cloth is removed from storage and preheated in an oven having a temperature of between 85°–100°C for a time period of between 25–35 minutes. The carbon cloth is then removed from this oven and placed on a hot die having the shape of either an inner or outer peripheral surface of a carbon friction disc. We have found that a thermosetting resin will adequately cure when a temperature of between 140°–160°C is used with a pressure of between 900–1100 psi for between 25–35 minutes. When the carbon cloth is removed from the mold die it will have a shape similar to that illustrated in FIG. 6, that is a U-shaped arcuate specimen. For some applications the carbon cloth sheath means is then trimmed to size to abut shoulder 66, as shown in FIG. 3. In order to be assured that a uniform coefficient of expansion will be present between the carbon friction disc 50 and the arcuate specimen it is necessary to char the filler means to retain the oxidization material within the carbon cloth within a carbonaceous matrix. The charring of the impregnated carbon cloth is carried out in an oven wherein the temperature can be varied in the following sequence.

During heating which is carried out in a nitrogen atmosphere the rate of change of temperature is increased as follows: 95°C/hr. room temperature up to 425°C; 38°C/hr. from 425°C to 595°C; and 205°C/hr. from 595°C to 1000°C at which temperature the resin in the filler material means will have been converted into a carbonaceous matrix. During cooling the rate of change of temperature will be uniformly decreased at 200°C/hr. from 1000°C to 200°C before being exposed to ambient atmosphere.

In some instances it is desirous to further increase the density of the carbon cloth sheath means 64 which can be accomplished by repeating the above impregnation by the filler means and repeating the char cycle.

The carbon cloth means 64 is now attached to the peripheral surface of the solid carbon disc 50 to encapsulate the area in which the continuous carbon fibers 54 are positioned between the slots 58 in the following manner. The interior of each U-shaped arcuate segment is painted with a mixture of thermosetting resin and amorphous boron in a methyl ethyl ketone solution. Each of the carbon cloth sheath means 64 are now placed on the peripheral surface 56 between a pair of driving notches 58. In one embodiment of the invention, a pair of carbon aligning pins 70 and 72 extends through the carbon disc 50, see FIG. 3. The carbon pins 70 and 72 rigidly hold the carbon cloth sheath means 64 adjacent the peripheral surface 56 to form a bond therebetween. After all the peripheral surfaces 56 have been covered by a carbon cloth sheath means 64 the rotor 40 is placed in an oven and dried for one hour at 70°C to remove the volatiles in the thermosetting resin binder. The temperature in the oven is increased at a rate of 53°C/hr. until a temperature of 250° C is reached and held for one hour after which the thermosetting resin will have developed a solid bond. The rotor 40 is now cooled to room temperature. When several rotors 40 have been constructed they are placed in an oven and a char cycle is performed in a manner as recited previously for charring the filler material for the carbon cloth sheath means 64 to provide a carbonaceous matrix for the barrier bond between the carbon sheath means 64 and the peripheral surface 56 of the carbon disc 50.

Upon removal of the rotors 40 from the char cycle, each rotor 40 will have an appearance similar to that illustrated in FIG. 4. This will be sufficient for most brake applications. However, to prevent potential handling damage to the rotor slot corners 58 during installation of the complete brake, a metal reinforcing plate 74 is attached to the peripheral surface by driving pins 76 and 78, as shown in FIG. 4. As shown in FIG. 5, the U-shaped carbon cloth sheath means is placed on shoulders 80 and 82, respectively. This will provide continuous solid backing for the reinforcing plate 74. In the embodiment shown in FIG. 5 the reinforcing plate 74 is adapted to cover the carbon aligning pins 70 and 72 to assure that the carbon cloth sheath means 64 remains relatively close to the peripheral surface 56 even in the event that the carbonaceous bond may be fractured.

The embodiment shown in FIG. 7 is adapted to illustrate the stator peripheral protection on the inner diameter 84. The carbon cloth sheath means 64 is exactly the same as on the rotor with the U-shaped arcuate segment reversed to fit the inner diameter 84.

To protect the carbon sheath means 64 from abrasion which can sometimes occur due to interference with other portions of the wheel, such as the axial key 60, it is necessary to add a cap or support means 80 to reinforce or keep the protection afforded by the carbon sheath means 64 adjacent the carbon friction disc. The cap or support means 80, see FIG. 8, includes a stainless steel screen 82 with a wire diameter in the range of from 7–12 mils and square weaves of from 18 to 28 mesh. The screen 82 which is formed in an arcuate shape has openings 84 and 86 along the ends thereof through which 76 and 78 extend for retaining the reinforcing plate 74.

In order to facilitate the fabrication of the carbon friction disc with oxidation protection provided by the sheath means 64 and the screen means 80, we discovered that the screen 82 could be integrally molded with the carbon cloth sheath 64 through the following method.

Figure 9:
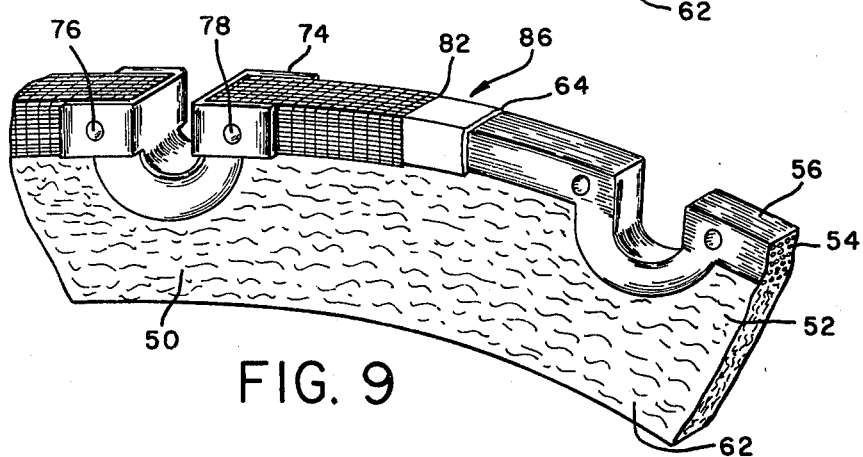
FIG. 9 is a perspective view of a segment of a carbon friction disc having a laminated screen and carbon sheath integrally bonded to the peripheral surface.
Figure 10:
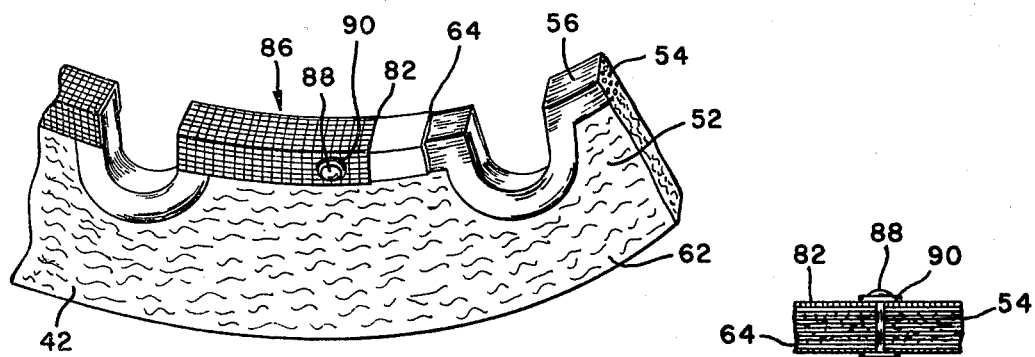
FIG. 10 is a perspective view of a laminated screen and carbon sheath integrally bonded to the inner periphery of a carbon friction disc.
Figure 11:
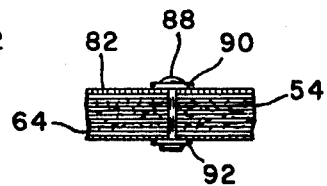
FIG. 11 is a sectional view of the rivet means in FIG. 10.

A sheet of carbon cloth sheath means 64 and a sheet of screen means 80 are dipped into a bath containing a filler selected from a group consisting of Phosphorous, Boron, Aluminum, Manganese, Chromium, Silicon, Tantalum, oxides of these elements, and a thermosetting resin suspended in a solvent. Each sheet is forced air dried from 1 to 2 hours after which a sheet of screen means 80 is placed on the outside of a sheet of carbon cloth sheath means 64 prior to the insertion into a hot die having the shape of either an inner or outer peripheral surface of a carbon friction disc. The thermosetting resin will flow to form a matrix for bonding the screen means 80 and carbon cloth sheath means 64 into an integral cap 86 as shown in FIG. 9 when the thermosetting resin is cured at a temperature of between 140°–160°C under a pressure of between 900–1100 psi for about 30 minutes.

The interior of the integral cap 86 is now painted with a bonding mixture of thermosetting resin and amorphous boron in a methyl ethyl ketone solution and placed on the periphery of the carbon friction disc. After the entire periphery is covered, the friction disc is placed in a die in an oven having a nitrogen atmosphere wherein pressure is applied to the integral cap 86 and the temperature maintained at about 70°C for 1 hour to remove the volatiles and cure the thermosetting resin binder. Thereafter, the temperature of the oven is increased at a rate of about 50°C/hr. until a temperature of 250°C is reached. Thereafter the temperature is raised at a rate of 95°C/hr. up to 425°C, then a rate of 40°C/hr. up to 595°C, and 205°C up to 1000°C at which temperature the resin in the filler and bonding mixture will have been converted into a carbonaceous matrix. The carbon friction disc with the attached integral cap 86 is now cooled at a rate of 200°C/hr. from 1000°C to 200°C before being exposed to atmosphere. The metal reinforcing plate 74 is then attached thereto by pin 76 and 78.

Since it has been found that the stators 42 do not require a metal reinforcing plate 74 we have determined that it is desirable to place a rivet 88 at approximately the center of the arcuate segment of the cap 86. A washer 90 and a washer 92 is placed on the outside of the screen to provide a greater surface area for holding the reinforced carbon cloth sheath means or cap 86 adjacent the periphery of the carbon friction disc 42.

MODE OF OPERATION OF THE PREFERRED EMBODIMENT

When an aircraft is making a landing the wheel 10 will develop a rotational torque which will rotate the rotor 40. The pilot upon landing will actuate a fluid pressure source (not shown) to supply piston 20 with a force which will move stators 42 axially toward backing plate 36 to develop frictional engagement between the stator carbon disc 42 and the rotor disc 40. This frictional engagement will generate heat which is distributed throughout the carbon disc in the rotor 40 and stator 42. As the thermal energy level in the rotor 40 and stator 42 increases above 400°C the filler means in the woven cloth sheath means 64 will react with atmospheric oxygen and form a barrier through which the further penetration of oxygen to the peripheral surface 56 is inhibited. The filler means will remain in a fluid state upon termination of the braking force until the stator 42 and rotor 40 have cooled below a temperature at which oxidization of the carbon will occur.

Thus, we have provided protection of non-swept areas of a carbon disc brake stator 42 and rotor 44 which will permit a material of uniform thickness impregnated with oxidization inhibitors to become an integral part or extension of the peripheral surface. The oxidization inhibitors can readily be selected to offer protection of the carbon substrate whose working environment will vary from an arid condition to a moist environment without affecting the frictional characteristic of the over-all carbon friction disc.

To substantiate the results of our invention we constructed a stack of stators 42 and rotors 40 in a manner taught in U.S. Pat. No. 3,639,197. A single thickness woven carbon cloth and screen wire prepegged by dipping the cloth and screen in a bath containing a solution of 33% thermosetting resin and solvent methyl ethyl ketone. The cloth and screen were removed from the bath and allowed to drip until the excess had run off. The prepegged carbon cloth and screen were then immersed in a bath containing 42% thermosetting resin, 27% graphite filler, 25% methyl ethyl ketone and 6% of oxidation inhibitor selected from a group consisting of Phosphorus, Boron, Aluminum, Manganese, Chromium, Silicon, Tantalum, and oxides of these elements. The impregnated carbon cloth and screen were then removed and the excess coating removed by being pulled over a glass rod. The carbon cloth and screen were then hung and forced air dried at room temperature for about 2 hours. The carbon cloth and screen were then placed in a vacuum oven having a temperature of between 90°–95°C for 30 minutes to make the resin begin to become pliable. The cloth and screen were then placed in a die and a pressure of 1000 psi applied for 30 minutes as the temperature was increased to 150°C. The screen reinforced carbon cloth specimen was then cooled to room temperature having taken on the shape of the die. The screen reinforced carbon cloth specimens were then trimmed to remove flash and create caps 86 having an arcuate length conforming to that between the drive slots on the peripheral surface of the friction disc interior. The interior of the screen reinforced carbon cloth caps 86 were then coated with a mixture of thermosetting resin and amorphous boron in a solution of methyl ethyl ketone and held against the peripheral surface between the drive slots of the carbon disc by a fixture. The carbon disc and the attached caps were then placed in an oven and the temperature increased at a rate 53°C/hr. up to 250°C, 95°C/hr. from 250°C to 425°C, 38°C/hr. from 425°C to 595°C, and 205°C/hr. from 595°C to 1000°C in a nitrogen atmosphere. At this time the thermosetting resin had been converted into a carbonaceous matrix through which the caps 86 were bonded to the carbon substrate. The carbonaceous matrix in carbon cloth will hold the oxidation retardent and moisture resistant agent in the caps to prevent oxygen from being presented to the peripheral surface. The rotor with the caps now attached was then cooled down to 200°C in the nitrogen environment before being exposed to air.

Steel reinforcement plates were attached to the periphery at the driving slots and the rotor and stator stack placed on a brake test stand. This brake test stand will simulate the stopping of an aircraft in accordance with FAA regulations requiring 100 stops before a brake can be certified for commercial use.

This brake stack passed this FAA regulation without oxidation degradation affecting the peripheral surface or over-all frictional characteristics of the carbon disc.

In order to evaluate the over-all effectiveness of the carbon sheath means 64, the screen means 80 and the integral screen reinforced carbon sheath or cap means 86, we obtained a carbon friction disc which was constructed to serve as a rotor for an aircraft. In the rotor we selected there were 7 available peripheral positions for evaluation.

We selected position No. 1 as our control and placed a standard oxidation inhibiting penetrant on the non-swept section. On position No. 2 we placed a carbon sheath means like that shown in FIG. 6. On position No. 3 we placed a screen means 80 over the carbon sheath 64 as shown in FIG. 7. On positions No. 4 and 5 we bonded an integral screen reinforced carbon sheath or cap means 86, this screen having a mesh size of 28. On positions No. 6 and 7 we bonded an integral screen reinforced carbon sheath or cap means 86, this screen having a mesh size of 22.

This rotor was then placed on a dynamometer which was mass loaded to simulate 500,000 ft.—lb./lb. The rotor assembly was rotated to simulate an initial sliding velocity of 83 ft./sec. and the brakes applied to stop the rotor assembly. The maximum temperature experienced by the rotor assembly was 2,000°F. A total of 90 stops was made by the rotor assembly before disassembly and evaluation.

We made the following observations of the various protection schemes offered to prevent oxidation of this carbon friction disc:

Position No. 1 — Fair protection — oxidation penetration up to 1/16 inch no resistance of surface to abrasion.

Position No. 2 — Good protection — oxidation of cap components allowed cap to be easily abraded and removed if engaged by some external member.

Position No. 3 — Cap same as Position No. 2 but screen provided abrasion protection.

Position No. 4 & 5 — Good protection — slightly heavier screen appeared to cause edges of caps to lift from substrate. Excellent abrasion resistance.

Positions No. 6 & 7 — Good protection — good adhesion — excellent abrasion resistance It was thus easily projected that each surface protected by the carbon sheath means 64 could be certified for commercial use in aircraft and those surfaces in which a screen means was also present, abrasion of the carbon sheath by external member could be prevented to provide oxidation protection under varying conditions without affecting the structural unity of the carbon friction disc.

We claim:

1. In a wheel and brake assembly having key-slot coupling means through which a braking torque is transmitted during frictional engagement of a plurality of carbon friction disc, said carbon friction disc having a peripheral surface subjected to an oxidizing environment as a result of the development of said frictional engagement, the improvement comprising:
    sheath means covering said periphery for preventing degradation of said carbon friction disc by oxygen, said sheath means having a coefficient of expansion substantially equal to said carbon friction disc to avoid the introduction of adverse stresses which could occur during exposure to the thermal operating range developed by said frictional engagement;
    first binder means located between said sheath means and said periphery for providing a carbon bond therebetween to extend the structural unity of the carbon friction disc to the sheath means;
    keeper means adjacent the sheath means for preventing any external member from abrading the sheath means sufficiently to allow degradation of said carbon friction disc;
    pin means extending through said sheath means and said carbon friction disc for reducing the possibility of fractionalization of said carbon bond during repetitive applications of said braking torque; and
    said keeper means including a screen means connected to said pin means and covering said sheath means for holding said sheath means against said periphery if said carbon bond should have broken because of said repetitive application of braking torque.

2. In the wheel and brake assembly, as recited in claim 1, wherein said keeper means further includes:
    reinforcing means covering said slots for distributing said braking torque to the carbon friction disc.

3. In the wheel and brake assembly, as recited in claim 2, wherein said sheath means includes:
    a series of cap means extending along said one periphery between the slots, each of said cap means including a carbon cloth having a U-shaped cross section to substantially encapsulate the periphery of the carbon friction disc.

4. In the wheel and brake assembly, as recited in claim 3, wherein each of said cap means includes:

filler means for impregnating said carbon cloth with oxidization inhibiting materials to prevent oxygen from passing through the pores therein at temperatures above 800°F by forming a protective oxide barrier for the carbon cloth.

5. In the wheel and brake assembly, as recited in claim 4, wherein said oxidization inhibiting materials are selected from a group consisting of Phosphorus, Boron, Aluminum, Manganese, Chromium, Silicon, Tantalum, and oxides of these elements.

6. In the wheel and brake assembly, as recited in claim 3, wherein said keeper means further includes:
second binder means located between said screen means and said carbon sheath to provide a unitary structure.

7. In the wheel and brake assembly, as recited in claim 6, wherein said second binder includes:
a resin material modified by oxidization inhibiting materials adapted to be charred to create a carbonaceous matrix for holding said screen means and said carbon sheath in a substantially stationary position.

8. In the wheel and brake assembly, as recited in claim 1, wherein said keeper means further includes:
rivet means extending through the arcuate center of said sheath means and screen means adjacent the periphery of said carbon friction disc.

9. In a wheel and brake assembly having key-slot coupling means through which a braking torque is transmitted during frictional engagement of a plurality of carbon friction discs, each of said carbon friction discs having a body of randomly oriented carbon fibers adjacent a band of continuous carbon fibers on one periphery held together by a carbonaceous matrix, said band of continuous carbon fibers being interwoven to increase the structural unity of the carbon friction disc and permit said braking torque to be carried through slots located on said one periphery, said continuous carbon fibers being subjected to an oxidizing environment as a result of the development of said braking torque, the improvement comprising:
sheath means covering said one periphery for preventing the degradation of said carbonaceous matrix retaining said continuous carbon fibers by oxygen, said sheath means having a coefficient of expansion substantially equal to said carbonaceous matrix to avoid the introduction of adverse stresses which could develop over the thermal operating range of said frictional engagement;
keeper means for retaining said sheath means adjacent said one periphery to prevent separation therebetween which would permit oxygen to be present at said one periphery;
binder means located between the sheath means and said one periphery for providing a carbon bond therebetween to extending the structural frictional unity of the carbon friction disc to the sheath means;
pin means extending through said sheath means and said band of continuous carbon fibers for reducing the possibility of fractionalization of said carbon bond during repetitive applications of said braking torque; and
said keeper means including a screen means connected to said pin means and covering said sheath means for holding said sheath means against said periphery if said carbon bond should have broken because of said repetitive application of braking torque.

10. In the wheel and brake assembly, as recited in claim 9, wherein said keeper means further includes:
reinforcing means covering said slots for distributing said braking torque to the carbon friction disc through said bond of continuous carbon fibers.

11. In the wheel and brake assembly, as recited in claim 10, wherein said sheath means includes:
a series of cap means extending along said one periphery between the slots, each of said cap means including a carbon cloth having a U-shaped cross section to substantially encapsulate the continuous carbon fibers in the carbonaceous matrix.

12. In the wheel and brake assembly, as recited in claim 11, wherein said screen means includes:
a series of said screen means covering each said cap means, each of said screen means having a U-shaped cross section corresponding to each of said cap means to provide reinforcement for the entire carbon cloth.

13. In the wheel and brake assembly as recited in claim 12, wherein said keeper means further includes:
second binder means located between each of said screen means and said carbon cloth cap means for providing a carbonaceous matrix to create a substantially unitary structure.

14. In the wheel and brake assembly, as recited in claim 11, wherein each of said cap means includes:
filler means for impregnating said carbon cloth with oxidization inhibiting materials to prevent oxygen from passing through the pores therein at temperatures above 800°F by forming a protective oxide barrier for the carbon cloth.

15. In the wheel and brake assembly, as recited in claim 14, wherein said oxidization inhibiting materials are selected from a group consisting of Phosphorus, Boron, Aluminum, Manganese, Chromium, Silicon, Tantalum, and oxides of these elements.

* * * * *